United States Patent [19]

Hörpel et al.

[11] Patent Number: 5,717,038
[45] Date of Patent: Feb. 10, 1998

[54] TIRE TREADS WITH INCREASED TREAD LIFE, AND METHOD OF MANUFACTURING SAME

[75] Inventors: Gerhard Hörpel, Nottuln; Karl-Heinz Nordsiek; Dieter Zerpner, both of Marl, all of Germany

[73] Assignee: Bayer Aktiengesellschaft, Leverkusen, Germany

[21] Appl. No.: 698,756

[22] Filed: Aug. 16, 1996

Related U.S. Application Data

[63] Continuation of Ser. No. 537,979, Oct. 2, 1995, abandoned, which is a continuation of Ser. No. 385,583, Feb. 8, 1995, abandoned, which is a continuation of Ser. No. 240,810, May 11, 1994, abandoned, which is a continuation of Ser. No. 896,722, Jun. 9, 1992, abandoned, which is a continuation of Ser. No. 605,434, Oct. 30, 1990, abandoned.

[30] Foreign Application Priority Data

Dec. 13, 1989 [DE] Germany .................. 39 41 118.4

[51] Int. Cl.$^6$ .................. C08L 9/06; C08L 9/10
[52] U.S. Cl. .................. 525/332.4; 525/332.6; 525/332.7; 525/333.1; 525/333.5; 525/333.6; 525/343; 525/351
[58] Field of Search .................. 525/332.4, 343, 525/332.6, 332.7, 333.1, 333.5, 333.6, 351

[56] References Cited

U.S. PATENT DOCUMENTS

| | | | |
|---|---|---|---|
| 3,814,160 | 6/1974 | Creasey | 152/209 R |
| 3,979,369 | 9/1976 | Trivette, Jr. | 525/333.9 |

Primary Examiner—W. Robinson H. Clark
Attorney, Agent, or Firm—Oblon, Spivak, McClelland, Maier & Neustadt, P.C.

[57] ABSTRACT

A tire tread made for polydiene rubber crosslinked with 1,2-bis(N,N-dibenzylthiocarbamoyldisulfido)ethane and method of producing the same.

10 Claims, No Drawings

TIRE TREADS WITH INCREASED TREAD LIFE, AND METHOD OF MANUFACTURING SAME

This application is a Continuation of application Ser. No. 08/537,979, filed on Oct. 2, 1995, now abandoned, which is a continuation of application Ser. No. 08/385,583, filed on Feb. 8, 1995, now abandoned, which is a continuation of application Ser. No. 08/240,810, filed on May 11, 1994, now abandoned, which is a continuation of application Ser. No. 07/896,722, filed on Jun. 9, 1992, now abandoned, which is a continuation of application Ser. No. 07/605,434, filed on Oct. 30, 1990, now abandoned.

BACKGROUND OF THE INVENTION

1. Field of the Invention

The invention relates to tire treads based on polydiene rubbers and customary adjuvants, and a method of manufacturing same.

2. Discussion of the Background

Tire treads are of special importance among the components of a tire, in that they comprise the narrow contact surface between the vehicle and the road. Accordingly, the driving characteristics of the vehicle depend on the type and quality of the rubber used in the treads.

There is intense interest in high tread life treads. The tread life of modern radial tires is essentially determined by the following tread factors:

1. The particular formulation (content of carbon black, content of oil, and crosslinking system);
2. The type of the rubber itself; and
3. The microstructure and molecular weight of the rubber.

The well known polydienes which are candidates for the purpose are, in Order of wear resistance: BR>SBR>NR/IR. Accordingly, pure BR treads have been found to have optimum tread life.

Because of the broad nature of the technical requirements which treads must meet, however, tread life cannot be considered in isolation. Safety considerations may be paramount, particularly non-skid properties on wet roads. Regarding non-skid properties, the order of advantage of the candidate rubbers presented above is reversed.

Because wear resistance and non-skid properties are based on the same principles of molecular movement, the art of formulating treads always represents a compromise.

In the case of tires designed for high loads or high speeds, one must further take into account the substantial heat buildup in service. This makes the choice of starting materials even more difficult.

It is possible to simultaneously improve wear and non-skid properties by employing carbon black capable of increased interaction between the carbon black and the rubber. However, as the activity of the carbon black increases there are increasing difficulties in distributing the carbon black particles in the rubber phase. In addition, the heat generation when such vulcanizates are dynamically loaded is substantially increased.

For decades, attempts have been made to alleviate the problems of changes in the rubber with age by adding special oxygen and radical acceptors (so-called antioxidants and antiozonants). Such additives have been effective in reducing quality degradation in the form of cracking and hardening. However, their effect on wear is unclear.

A further variable in the optimization of tire tread vulcanizates is the effect of sulfur crosslinking bridges. When customary systems comprising sulfur and accelerators are employed, as a rule one obtains vulcanizates wherein the polymer chains are linked by polysulfide bridges. Such crosslinked vulcanizates give good results with regard to a number of properties (Chapman, A. V., and Porter, M., "Sulfur Vulcanization Chemistry", in Roberts, A. D., ed., 1988, "Natural Rubber—Science and Technology", pub. Oxford Press). This is true particularly of wear resistance as well as mechanical strength. A disadvantage is that under thermal stress the polysulfide bridges degrade down to monosulfide structures. The sulfur liberated attaches to polymer segments, and also catalyzes the attack of oxygen on the rubber. Both effects lead to damage of the crosslinking system. The described side reactions of sulfur, which can also occur during the vulcanization process, have a major effect on the performance limits of tire treads during vehicle operation, and therefore necessitate limitations with regard to the optimal manufacturing process (Chapman and Porter, loc.cit.). So-called EV systems represent one measure for reducing side reactions of sulfur. EV systems employ larger amounts of vulcanization accelerators and, at the same time, minimal amounts of sulfur. Due to the increased rate of vulcanization, however, process safety is detrimentally affected. Of greater importance for the quality of tire treads is preprogrammed deterioration of wear resistance (Lewis, P. M., 1986, "Vulcanizate structure and its effects on properties", NR Technology Quarterly, Vol. 17 Part 4, pp. 57 ff).

SUMMARY OF THE INVENTION

Accordingly, one object of the present invention is to provide tire treads with much longer tread life while retaining good non-skid behavior.

This and other objects have been achieved with tire treads based on polydiene rubbers along with customary adjuvants such as carbon blacks, silicic acids, plasticizers, resins, and vulcanizing agents. The present invention is directed to the use of stable 1,2-dithioethanediyl bridges instead of oligomeric S-bridges to form the crosslinking system.

DETAILED DESCRIPTION OF THE PREFERRED EMBODIMENTS

The crosslinking agent employed is 1,2-bis(N,N-diethylthiocarbamoyldisulfido)-ethane, or as per IUPAC nomenclature, N,N-diethylthiocarbamic acid (dithioperoxo)-1,2-ethanediyl ester (hereinafter called BDTE).

It was found, surprisingly, that the numerous requirements for such a cross-linking reagent are also met by 1,2-bis(N,N-dibenzylthiocarbamoyldisulfido)ethane, or as per IUPAC nomenclature, N,N-dibenzylthio-carbamic acid (dithioperoxo)-1,2-ethanediyl ester (hereinafter called BDBzTE). Moreover, from the toxicological standpoint BDBzTE has an important advantage. The secondary amine used for synthesizing the crosslinking agent may be regenerated during the processing or vulcanization, followed by nitrosation analogous to that observed with the use of conventional vulcanization accelerators based on zinc dithiocarbamates and thiurams. Nitrosamines from secondary amines are particularly easily formed. The carcinogenicity of such nitrosamines have been studied intensely for a relatively long time (Deutsche Forschungsgemeinschaft, 1983, "Das Nitrosamine-Problem", edited by R. Preussman, pub. Verlag Chemie). Certain compounds among the secondary amines have been discovered (Druckrey et al., 1967, Z. Krebsforschung, 69, 103), the nitrosamines of which are non-carcinogenic. Among these secondary amines, dibenzylamine occupies a special position, on the following grounds:

1) Dibenzylamine is readily available and contains no environmentally hazardous components, such as, e.g., bis(2,2,2-trifluoroethyl)amine.

2) The amine nitrogen is not sterically blocked in such a way as to hinder a reaction with carbon disulfide and alkali hydroxide to produce the alkali dithiocarbamate required as an intermediate product, for example 2,2,6,6-tetramethylpiperidine (1977 J. f. prakt. Chem., 319, 516).

3) The alkali salts of N,N-dibenzyldithiocarbamic acid are not hydrolysis-sensitive, and therefore they can be produced in water and converted to the crosslinking agent BDBzTE in high yield (e.g., tert-butyl-methylamine).

4) With the aid of vulcametry it was found that with corresponding molar amounts of the crosslinking agent BDBzTE obtained on the basis of dibenzylamine, the crosslinking densities achieved are comparably higher than to those achieved with similar crosslinking agents based on diethylamine or dimethylamine. The vulcameter curve shows clearly that at 180° C. there is no reversion within time periods on the order of customary reaction times with these three crosslinking agents. In contrast, surprisingly, it was found that with corresponding crosslinking agents synthesized from cyclohexylamine or 2,6-dimethylpiperidine, the crosslinking density is much less and a significant amount of reversion occurs. Accordingly, these latter two compounds are not candidates for use according to the invention.

Suitable for use as the rubbers are, particularly, NR, IR, BR, and/or SBR; preferred are integral rubbers (see Nordsiek, K. H., 1985 Kautschuk und Gummi-Kunststoffe, 38, 178; and Ger. OS 37 10 002, OS 37 24 871, and OS 38 04 547). The crosslinking reaction is preferably carried out at 150°–200° C., more preferably 170°–190° C.

The inventive tire treads provide substantial wear reduction. Moreover, the non-skid properties are essentially unchanged, despite the much greater tread life. This represents a great advance over the compromise mentioned above between wear performance and non-skid properties. The effect is particularly advantageous for integral rubbers. In addition to the wear resistance (particularly following weathering and aging), superior results are obtained in other vulcanization properties, e.g. tear resistance, elongation at failure, and tear propagation resistance, and particularly the properties related to elasticity, especially heat buildup.

Tire treads of tires with emergency running characteristics, i.e. tires which can be driven on even in the case of a leak or blowout, are subjected to extraordinarily severe mechanical and thermal stresses under emergency conditions. The use of the inventive crosslinking reagent is particularly effective in this application.

The use of organic polysulfide derivatives of general formula

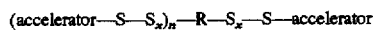
(accelerator—S—S$_x$)$_n$—R—S$_x$—S—accelerator for producing thermally stable vulcanizates is disclosed in Ger. Pat. 22 56 511. 1,2-bis(N,N-diethylthiocarbamoyldisulfido)ethane and 1,2-bis(N,N-dibenzylthiocarbamoyldisulfido)ethane are mentioned in that patent, along with numerous other vulcanizing agents, but no hint is given that these agents are outstandingly suited for producing tire treads with increased tread life.

In Ger. Pat. 22 65 382 it is asserted that the vulcanizates described therein have high thermal stability, but this assertion applies only for instances in which sulfur is added (see Table 14, in cols. 43 and 44). It appears that very high moduluses can be achieved only with addition of sulfur (see col. 8 line 38). The bridge-forming group R may be an organic group with practically unlimited structure and up to 50 or more carbon atoms (col. 6 lines 40–66). Nowhere in this publication is it suggested that the ethylene bridge is superior to all other groups with regard to crosslinking yield and aging properties. Accordingly, the general disclosure provided by these publications does not give one skilled in the art any hint as to how to solve the tire tread problems described above.

The only rubbers which are candidates for the inventive method are polydienes. The following rubbers in particular are of industrial importance:

natural rubber (NR);

isoprene rubber (IR);

styrene-butadiene rubber produced by emulsion polymerization (E-SBR);

styrene-butadiene rubber produced by solution polymerization (L-SBR);

styrene-butadiene rubber having a vinyl content of more than 15% (based on the number of butadiene units) (vinyl-SBR);

butadiene rubbers, which contain more than 20% double bonds in the cis configuration (cis-BR); and butadiene rubbers having a vinyl content of more than 15% (vinyl-BR).

The definitions of the above-named rubbers also include copolymers containing up to 40% of other customary comonomers. Obviously, blends of the above-described rubbers may also be used. For passenger automobiles, SBR and SBR/BR blends are preferred; for trucks, NR, NR/BR blends, and NR/SBR blends are preferred. Integral rubbers are particularly preferred.

The 1,2-dithioethanediyl bridges are introduced via 1,2-bis(N,N-diethylthiocarbamoyldisulfido)ethane (BDTE)

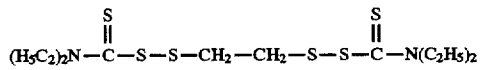

$(H_5C_2)_2N-\overset{S}{\overset{\|}{C}}-S-S-CH_2-CH_2-S-S-\overset{S}{\overset{\|}{C}}-N(C_2H_5)_2$ or 1,2-bis(N,N-dibenzylthiocarbamoyldisulfido)ethane (BDBzTE)

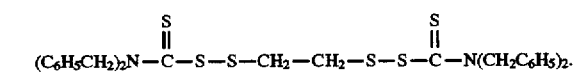

$(C_6H_5CH_2)_2N-\overset{S}{\overset{\|}{C}}-S-S-CH_2-CH_2-S-S-\overset{S}{\overset{\|}{C}}-N(CH_2C_6H_5)_2$.

There is no alternative to the thiocarbamoyl group in the choice of leaving group. The crosslinking yield when a xanthate leaving group is used is zero. In experiments with 1,2-bis(isopropyloxythiocarbonyldisulfido)ethane in SBR and NR mixtures, the values of the 300% modulus remain negligibly small. In agreement with Ger. OS 22 56 511, dithiophosphatyl-, benzothiazolyl-, and oxazolyl leaving groups also give unsatisfactorily low crosslinking yields, in the absence of sulfur addition. Further, when the dithiophosphatyl groups were tested as leaving groups, noxious fumes were a major problem.

The choice of the crosslinking bridge led unambiguously to ethyl ($C_2$) on grounds of clear superiority to the other candidates in the areas of crosslinking yields and aging behavior of the corresponding vulcanized rubber.

The starting point for synthesis of the crosslinking agents to be used according to the invention is dichloroethane. The reaction with sodium thiosulfate leads in aqueous solution to the bis-Bunte salt. Reaction of the bis-Bunte salt with sodium diethyldithiocarbamate gives BDTE (see Ger. OS 22 56 511); and analogously reaction with sodium dibenzyldithiocarbamate gives BDBzTE. BDBzTE is a "white" crystalline solid with melting point 112°–113° C. (13C-NMR: $CH_2$ (bridge)=37 ppm; $CH_2$ (benzyl group) 54 and 58 ppm; C (phenyl ring)=127–135 ppm; =NC(S)S—=199 ppm.)

The vulcanizate is produced in a manner which is itself known, by mixing the rubber components with the adjuvants. The critical factor is the addition of the inventive crosslinking agent. Customary adjuvants are, e.g., carbon black, silicic acids, plasticizers, and resins. Customary mixing apparatus is used for the mixing (e.g. kneaders, and roll mixers). The temperature settings depend in known fashion on the composition of the formulation and on the mixture properties. There is essentially no need for antiagers or ozone protection agents, because of the high stability of the crosslinking system which can be achieved according to the invention. Oil is added generally in the amount of 5–40 phr (parts per hundred parts rubber, by weight) and carbon black generally in the amount of 40–90 phr. The crosslinking agent is added in the amount of 3–6 to 4–9 phr.

As a rule, no advantage is gained by also adding sulfur, because undesirable reversion is accentuated.

VULKANOX® 4010 NA (N-isopropyl-N'-phenyl-p-phenylenediamine) is an anti-aging additive and ozone protectant, marketed by Bayer AG, of D-5090 Leverkusen, FRG.

VULKANOX® 4020 (N-(1,3-dimethylbutyl)-N'-phenyl-p-phenylenediamine) is an anti-aging additive and ozone protectant, marketed by Bayer AG.

KORESIN® is a reaction product of p-tert-butylphenol and acetylene, marketed as a processing-aid additive by BASF AG, D-6700 Ludwigshafen, FRG.

CBS (N-cyclohexyl-1-benzothiazolesulfenamide) is a vulcanization accelerator marketed by Bayer AG under the trade name VULKAZIT® CZ.

The tensile strength and elongation at failure were determined according to DIN 53 504.

The stress at 100% (and 300%) elongation (also called the modulus of elongation at 100% or 300%) was determined according to DIN 53 504.

The structural strength was determined according to Pohle (Bostroem, S., "Kautschuk-Handbuch", Vol. 5, pub. Berliner Union, at Stuttgart, p. 123).

The tension set (residual elongation from tensile deformation) was determined according to DIN 53 518.

The hardness (Shore A) was determined according to DIN 53 505.

The resilient elasticity was determined according to DIN 53 512.

The abrasive wear was determined according to DIN 53 516.

The compression set (residual compression from compressive deformation) was determined according to DIN 53 517.

The heat buildup test was performed according to DIN 53 533, Part 3, with the aid of a Goodrich flexometer, which method is designated below as "Method 1" and also by "Method 5" when using the following accentuated test conditions: load=500 N, initial temperature=50°, time=25 min.

The sphere crushing test under various loads was according to Bostroem, S., op.cit., Vol. 5, pp. 149–150.

The vulcametry was carried out according to DIN 53 529.

Other features of the invention will become apparent in the course of the following descriptions of exemplary embodiments which are given for illustration of the invention and are not intended to be limiting thereof.

EXAMPLES

All of the tire tread vulcanizates described below were produced as follows:

With the aid of a "GK 2" interior mixer (supplied by Werner & Pfleiderer), at 50 rpm and a jacket temperature of 40° C, the following mixtures were prepared (composition in parts per hundred parts rubber, "phr"):

| Rubber | 100 phr |
| ZnO | 3 |
| Stearic acid | 2 |
| Aromatic plasticizer oil | 10 |
| N-339 carbon black | 50 |
| Crosslinking agent | (see Tables). |

After 1 min processing time for the rubber, the adjuvants were added. Mixing was terminated one minute after the energy maximum for the rotor was exceeded.

After letting the mixture stand 6 hr, the crosslinking agent was worked-in on a roll apparatus, with a roll temperature of 50° C. and a processing time of 5 min.

The types and amounts of the crosslinking agents, and the temperature program for the subsequent vulcanization, are given in the following Tables.

TABLE 1

Vulcanization of a premasticated NR with a Mooney viscosity of 70 (RRS No. 3)

| | Example | | | | |
|---|---|---|---|---|---|
| | A | B | C | D | 1 |
| | | | 1,2-Bis-(N,N-diethyl-thiocarbamoyldisulfido-) | | |
| Crosslinking system | Sulfur/CBS 2.5/0.6 phr | Sulfur/CBS 0.5/2.5 phr | decane 6 phr | hexane 5 phr | ethane 4 phr |
| Vulcameter (150° C.) $t_{10}$, minutes | 7.7 | 5.2 | 9.8 | 8.9 | 7.4 |
| $t_{90}$, minutes | 12.9 | 8.9 | 28.3 | 24.4 | 14.8 |
| Delta-t, minutes | 5.2 | 3.7 | 18.5 | 15.5 | 7.4 |
| Structure of the crosslinking bridges | —$S_x$— | —$S_1$— | —S—$(CH_2)_{10}$—S— | —S—$(CH_2)_6$—S— | —S—$(CH_2)_2$—S— |
| Vulcanization time at 150° C., minutes | 30 | 30 | 40 | 40 | 30 |

TABLE 1-continued

Vulcanization of a premasticated NR with a Mooney viscosity of 70 (RRS No. 3)

| | Example | | | | |
|---|---|---|---|---|---|
| | A | B | C | D | 1 |
| | | | 1,2-Bis-(N,N-diethyl-thiocarbamoyldisulfido-) | | |
| Crosslinking system | Sulfur/CBS 2.5/0.6 phr | Sulfur/CBS 0.5/2.5 phr | decane 6 phr | hexane 5 phr | ethane 4 phr |
| Tensile strength, MPa | 21.0 | 25.2 | 20.5 | 22.8 | 22.3 |
| Elongation at failure, % | 504 | 543 | 586 | 545 | 520 |
| Modulus at 100% elongation, MPa | 1.8 | 1.7 | 1.7 | 1.8 | 1.9 |
| Modulus at 300% elongation, MPa | 9.5 | 10.1 | 9.1 | 9.4 | 11.4 |
| Structural strength, N/mm | 74 | 71 | 74 | 79 | 77 |
| Tension set, % | 16 | 15 | 14 | 15 | 10 |
| Shore A hardness at 22° C. | 62 | 63 | 62 | 65 | 65 |
| Shore A hardness at 75° C. | 56 | 55 | 55 | 56 | 61 |
| Resilient elasticity at 22° C., % | 47 | 47 | 47 | 44 | 48 |
| Resilient elasticity at 75° C., % | 58 | 58 | 57 | 58 | 60 |
| DIN abrasive wear, $mm^3$ | 121 | 137 | 193 | 150 | 120 |
| Density, $cm^3$ | 1.10 | 1.10 | 1.09 | 1.10 | 1.10 |
| Compression set, 24 hr. at 70° C., % | 34 | 27 | 36 | 34 | 25 |
| Goodrich flexometer (Method 1), | | | | | |
| °C. | +26 | +21 | +26 | +21 | +19 |
| flow | −3.2 | −1.8 | −3.7 | −2.6 | −0.8 |
| Goodrich flexometer (Method 5), | +42 | +33 | +43 | +38 | +30 |
| °C. | +42 | +33 | +43 | +38 | +30 |
| flow | −4.8 | −2.0 | −6.0 | −4.0 | −1.5 |
| Sphere crushing test | | | | | |
| 150 N | 102 | 95 | 115 | 94 | 93 |
| 200 N | 131 | 120 | 152 | 120 | 116 |
| 250 N | 152 | 145 | — | 153 | 130 |
| 300 N | — | 194 | — | — | 150 |
| 350 N | — | — | — | — | 170 |
| 400 N | — | — | — | — | — |

The tests show that only bis(dithio)ethane bridges enable a level of abrasive wear which is comparable to the classical sulfur vulcanization. The same applies to the dynamic properties (Goodrich flexometer and sphere crushing test).

TABLE 1a

Vulcanization of a premasticated NR with a Mooney viscosity of 70 (RRS No. 3)

| | Example | | | | |
|---|---|---|---|---|---|
| | A | B | Ca | Da | 1a |
| | | | 1,2-Bis-(N,N-diethyl-thiocarbamoyldisulfido-) | | |
| Crosslinking system | Sulfur/CBS 2.5/0.6 phr | Sulfur/CBS 0.5/2.5 phr | decane 7.0 phr | hexane 6.5 phr | ethane 6.0 phr |
| Vulcameter (150° C.) $t_{10}$, minutes | 7.7 | 5.2 | 13.6 | 13.7 | 13.1 |
| $t_{90}$, minutes | 12.9 | 8.9 | 33.8 | 34.3 | 29.0 |
| Delta-t, minutes | 5.2 | 3.7 | 20.2 | 20.6 | 15.9 |
| Structure of the | —$S_x$— | —$S_1$— | —S—$(CH_2)_{10}$—S— | —S—$(CH_2)_6$—S— | —S—$(CH_2)_2$—S— |

TABLE 1a-continued

Vulcanization of a premasticated NR with a Mooney viscosity of 70 (RRS No. 3)

| | Example | | | | |
|---|---|---|---|---|---|
| | A | B | Ca | Da | 1a |
| | | | 1,2-Bis-(N,N-diethyl-thiocarbamoyldisulfido-) | | |
| Crosslinking system | Sulfur/CBS 2.5/0.6 phr | Sulfur/CBS 0.5/2.5 phr | decane 7.0 phr | hexane 6.5 phr | ethane 6.0 phr |
| crosslinking bridges | | | | | |
| Vulcanization time at 150° C., minutes | 30 | 30 | 40 | 40 | 40 |
| Tensile strength, MPa | 21.0 | 25.2 | 19.4 | 18.1 | 21.8 |
| Elongation at failure, % | 504 | 543 | 478 | 516 | 522 |
| Modulus at 100% elongation, MPa | 1.8 | 1.7 | 1.3 | 1.4 | 1.7 |
| Modulus at 300% elongation, MPa | 9.5 | 10.1 | 7.9 | 8.3 | 9.6 |
| Structural strength, N/mm | 74 | 71 | 70 | 71 | 78 |
| Tension set, % | 16 | 15 | 16 | 15 | 10 |
| Shore A hardness at 22° C. | 62 | 63 | 60 | 62 | 63 |
| Shore A hardness at 75° C. | 56 | 55 | 55 | 54 | 56 |
| DIN abrasive wear, $mm^3$ | 121 | 137 | 199 | 155 | 127 |
| Density, $cm^3$ | 1.10 | 1.10 | 1.09 | 1.10 | 1.10 |
| Compression set, 24 hr. at 70° C., % | 34 | 27 | 36 | 35 | 30 |
| Goodrich flexometer (Method 1), | | | | | |
| °C. | +26 | +21 | +26 | +25 | +22 |
| flow | −3.2 | −1.8 | −3.9 | −2.4 | −0.9 |
| Goodrich flexometer (Method 5), | | | | | |
| °C. | +42 | +33 | +45 | +39 | +31 |
| flow | −4.8 | −2.0 | −6.3 | −4.3 | −1.6 |
| Sphere crushing test | | | | | |
| 150 N | 102 | 95 | 97 | 89 | 85 |
| 200 N | 131 | 120 | 126 | 116 | 111 |
| 250 N | 152 | 145 | 158 | 149 | 132 |
| 300 N | — | 194 | — | — | 150 |
| 350 N | — | — | — | — | 176 |
| 400 N | — | — | — | — | — |

The test show that only bis(dithio)ethane bridges enable a level of abrashive wear which is comparable to the classical sulfur vulcanization. The same applies to the dynamic properties (Goodrich flexometer and sphere crushing test).

TABLE 2

Vulcanization of a premasticated NR (Mooney viscosity 70; RRS No. 3) with BDTE (4.5 phr) at an elevated reaction temperature.

| | | Example 2 | | | | |
|---|---|---|---|---|---|---|
| Vulcanization temp. | 150° C. | 180° C. | | | | |
| Vulcanization time, min. | 30 | 5 | 10 | 15 | 20 | 30 |
| Vulcameter, 150° C. | 7.6 | | | | | |
| $t_{10}$, minutes | | | | | | |
| $t_{90}$, minutes | 14.0 | | | | | |
| Delta-t minutes | 6.4 | | | | | |
| Tensile strength MPa | 22.8 | 20.1 | 19.0 | 18.9 | 18.9 | 17.0 |
| Elongation at failure, % | 545 | 509 | 478 | 475 | 468 | 445 |

TABLE 2-continued

Vulcanization of a premasticated NR (Mooney viscosity 70; RRS No. 3) with BDTE (4.5 phr) at an elevated reaction temperature.

| Vulcanization temp. | 150° C. | Example 2 180° C. | | | | |
|---|---|---|---|---|---|---|
| Vulcanization time, min. | 30 | 5 | 10 | 15 | 20 | 30 |
| Modulus of elongation, MPA - | | | | | | |
| 100% | 1.8 | 1.6 | 1.7 | 1.6 | 1.7 | 1.7 |
| 300% | 10.4 | 9.1 | 9.5 | 9.7 | 9.3 | 9.1 |
| Structural strength, N/mm | 79 | 85 | 72 | 71 | 71 | 67 |
| Tension set, % | 11 | 10 | 10 | 11 | 10 | 11 |
| Shore A hardness, | | | | | | |
| 20° C. | 64 | 63 | 63 | 63 | 63 | 63 |
| 75° C. | 58 | 53 | 54 | 53 | 53 | 53 |
| Resilient elasticity at | | | | | | |
| 22° C., % | 48 | 47 | 49 | 49 | 47 | 48 |
| 75° C., % | 59 | 57 | 57 | 57 | 56 | 56 |
| DIN abrasive wear, mm$^3$ | 126 | 132 | 133 | 140 | 145 | 130 |
| Density, g/cm$^3$ | 1.10 | 1.10 | 1.10 | 1.10 | 1.10 | 1.10 |
| Compression set, 24 hr. at 70° C., % | 27 | 34 | 30 | 34 | 33 | 34 |
| Goodrich flexometer, (Method 1) | | | | | | |
| °C. | +21 | +28 | +26 | +26 | +26 | +26 |
| flow | −2.6 | −5.1 | −2.7 | −3.4 | −3.1 | −3.6 |
| Sphere crushing test | | | | | | |
| 150 N | 94 | | 99 | 96 | 97 | 93 |
| 200 N | 120 | | 122 | 123 | 126 | 20 |
| 250 N | 132 | | 139 | 145 | 143 | 45 |
| 300 N | 152 | | 162 | 175 | 165 | 170 |
| 350 N | 175 | | — | — | — | — |

TABLE 2a

Vulcanization of a premasticated NR (Mooney viscosity 70; RRS No. 3) with BDBzTE (7.0 phr) at an elevated reaction temperature

| Vulcanization temp. | 150° C. | Example 2a 180° C. | | | | |
|---|---|---|---|---|---|---|
| Vulcanization time, min. | 40 | 5 | 10 | 15 | 20 | 30 |
| Vulcameter, 150° C. | 12.9 | | | | | |
| $t_{10}$, minutes | | | | | | |
| $t_{90}$, minutes | 29.7 | | | | | |
| Delta-t minutes | 16.8 | | | | | |
| Tensile strength MPa | 20.5 | 15.7 | 18.1 | 19.3 | 18.9 | 18.4 |
| Elongation at failure, % | 506 | 544 | 511 | 503 | 487 | 466 |
| Modulus of elongation, MPA - | | | | | | |
| 100% | 1.8 | 1.1 | 1.6 | 1.7 | 1.7 | 1.7 |
| 300% | 10.1 | 6.3 | 9.1 | 9.8 | 9.9 | 9.4 |
| Structural strength, N/mm | 81 | 89 | 81 | 79 | 79 | 76 |
| Tension set, % | 10 | 19 | 13 | 10 | 11 | 9 |
| Shore A hardness, | | | | | | |
| 20° C. | 65 | 58 | 64 | 64 | 63 | 64 |
| 75° C. | 54 | 49 | 55 | 57 | 55 | 57 |
| Resilient elasticity at | | | | | | |
| 22° C., % | 44 | 40 | 43 | 43 | 42 | 43 |
| 75° C., % | 58 | 49 | 55 | 57 | 55 | 57 |
| DIN abrasive wear, mm$^3$ | 132 | 153 | 143 | 137 | 141 | 149 |

TABLE 2a-continued

Vulcanization of a premasticated NR (Mooney viscosity 70; RRS No. 3) with BDBzTE (7.0 phr) at an elevated reaction temperature

| Vulcanization temp. | 150° C. | Example 2a 180° C. | | | | |
|---|---|---|---|---|---|---|
| Vulcanization time, min. | 40 | 5 | 10 | 15 | 20 | 30 |
| Density, g/cm³ | 1.10 | 1.10 | 1.09 | 1.10 | 1.10 | 1.10 |
| Compression set, 24 hr. at 70° C., % | 29 | 39 | 35 | 31 | 29 | 30 |
| Goodrich flexometer, (Method 1) | | | | | | |
| °C. | +23 | +28 | +27 | +25 | +26 | +24 |
| flow | −1.6 | −5.2 | −3.4 | −3.3 | −2.9 | −3.5 |
| Sphere crushing test | | | | | | |
| 150 N | 88 | | | 93 | 95 | 95 |
| 200 N | 116 | | | 113 | 117 | 122 |
| 250 N | 128 | | | 139 | 135 | 142 |
| 300 N | 157 | | | 164 | 159 | 171 |
| 350 N | 179 | | | — | — | — |

Results of Example 2 and Comparison Example E:

The results show the very high network stability when bis(dithio)ethane bridges are introduced at elevated reaction temperatures. This is particularly true of the following properties: moduli, structural strength (=resistance to tear propagation), resilient elasticity, dynamic properties, and particularly abrasive wear.

TABLE 3

Vulcanization of a premasticated NR (Mooney viscosity 70; RRS No. 3) with the vulcanization system sulfur/CBS (2.5/0.6 phr) at an elevated reaction temperature

| Vulcanization temp. | 150° C. | Comparison Example 2 180° C. | | | | |
|---|---|---|---|---|---|---|
| Vulcanization time, min. | 30 | 5 | 10 | 15 | 20 | 30 |
| Vulcameter, 150° C. | 7.6 | | | | | |
| $t_{10}$, minutes | | | | | | |
| $t_{90}$, minutes | 12.5 | | | | | |
| Delta-t minutes | 4.9 | | | | | |
| Tensile strength MPa | 23.3 | 18.8 | 17.5 | 14.5 | 13.8 | 11.9 |
| Elongation at failure, % | 558 | 498 | 424 | 510 | 526 | 483 |
| Modulus of elongation, MPA - | | | | | | |
| 100% | 2.0 | 1.6 | 1.3 | 1.3 | 1.1 | 1.1 |
| 300% | 10.1 | 8.5 | 6.6 | 5.7 | 5.4 | 5.3 |
| Structural strength, N/mm | 74 | 64 | 26 | 19 | 18 | 16 |
| Tension set, % | 16 | 15 | 13 | 9 | 11 | 10 |
| Shore A hardness, | | | | | | |
| 20° C. | 61 | 58 | 55 | 54 | 53 | 52 |
| 75° C. | 57 | 52 | 46 | 45 | 44 | 43 |
| Resilient elasticity at | | | | | | |
| 22° C., % | 48 | 50 | 47 | 45 | 46 | 44 |
| 75° C., % | 60 | 60 | 54 | 51 | 50 | 49 |
| DIN abrasive wear, mm³ | 129 | 121 | 148 | 189 | 224 | 247 |
| Density, g/cm³ | 1.10 | 1.10 | 1.10 | 1.10 | 1.10 | 1.10 |
| Compression set, 24 hr. at 70° C., % | 34 | 42 | 38 | 38 | 41 | 45 |
| Goodrich flexometer, (Method 1) | | | | | | |
| °C. | +26 | +32 | +28 | +34 | +36 | +42 |
| flow | −3.2 | −3.2 | −4.8 | −7.1 | −6.5 | −7.0 |

TABLE 3-continued

Vulcanization of a premasticated NR (Mooney viscosity 70; RRS No. 3) with the vulcanization system sulfur/CBS (2.5/0.6 phr) at an elevated reaction temperature

| Vulcanization temp. | 150° C. | Comparison Example 2 180° C. | | | | |
|---|---|---|---|---|---|---|
| Vulcanization time, min. | 30 | 5 | 10 | 15 | 20 | 30 |
| Sphere crushing test | | | | | | |
| 150 N | 102 | 109 | 118 | 136 | 150 | |
| 200 N | 130 | 120 | 165 | 165 | — | |
| 250 N | 155 | 152 | — | — | — | |
| 300 N | — | — | — | — | — | |
| 350 N | — | — | — | — | — | |

Results of Example 3 and Comparison Example F:

It is seen from a comparison of the results that the wear resistance deteriorates much less upon aging with the crosslinked rubbers of the present invention.

TABLE 4

Vulcanization of a blend of NR and cis-BR (ratio 80:20 by weight) with BDTE (4.5 phr) - Example 3

| | Vulcanization | After aging at 100 °C. | | |
|---|---|---|---|---|
| Property | 40 min at 150 °C. | 7 d | 14 d | 21 d |
| Tensile strength, MPa | 21.2 | 20.2 | 15.5 | 13.4 |
| Elongation at failure, % | 522 | 416 | 257 | 237 |
| Modulus of elongation, | | | | |
| MPa - 100% | 2.1 | 2.7 | 4.3 | 4.4 |
| 300% | 9.6 | 13.2 | — | — |
| Structural strength, N/mm | 69 | 72 | 57 | 47 |
| Tension set, % | 13 | 9 | 5 | 4 |
| Shore A hardness, | | | | |
| 22° C., | 62 | 67 | 76 | 77 |
| 75° C., | 58 | 62 | 68 | 69 |
| Resilient elasticity | | | | |
| at 22° C., % | 49 | 51 | 51 | 54 |
| 75° C., % | 60 | 60 | 61 | 60 |
| DIN abrasive wear, mm$^3$ | 109 | 140 | 172 | 181 |
| Density, g/cm$^3$ | 1.09 | 1.09 | 1.09 | 1.09 |
| Compression set, 24 hr. at 70° C., % | 18 | 21 | 21 | 22 |
| Sphere crushing test | | | | |
| 150 N | 94 | 85 | 85 | 89 |
| 200 N | 122 | 113 | 120 | 113 |
| 250 N | 139 | 138 | 143 | 141 |
| 300 N | 164 | 163 | 165 | 160 |
| 350 N | — | 192 | 176 | 195 |
| 400 N | — | — | — | — |

TABLE 4a

Vulcanization of a blend of NR and cis-BR (ratio 80:20 by weight) with BDBzTE (7.0 phr) - Example 3a

| | Vulcanization | After aging at 100° C. | | |
|---|---|---|---|---|
| Property | 40 min at 150° C. | 7 d | 14 d | 21 d |
| Tensile strength, MPa | 19.8 | 17.3 | 12.4 | 10.7 |
| Elongation at failure, % | 512 | 403 | 298 | 243 |
| Modulus of elongation, | | | | |
| MPa - 100% | 1.7 | 2.3 | 2.9 | 3.9 |
| 300% | 9.2 | 11.6 | — | — |
| Structural strength, N/mm | 79 | 76 | 61 | 49 |
| Tension set, % | 13 | 10 | 8 | 7 |
| Shore A hardness, | | | | |
| 22° C., | 63 | 70 | 73 | 75 |
| 75° C., | 54 | 59 | 63 | 64 |
| Resilient elasticity | | | | |
| at 22° C., % | 46 | 49 | 48 | 48 |
| 75° C., % | 59 | 53 | 54 | 53 |
| DIN abrasive wear, mm$^3$ | 127 | 149 | 181 | 197 |
| Density, g/cm$^3$ | 1.09 | 1.09 | 1.09 | 1.09 |
| Compression set, 24 hr. at 70° C., % | 23 | 23 | 25 | 28 |
| Sphere crushing test | | | | |
| 150 N | 89 | 83 | 84 | 89 |
| 200 N | 114 | 110 | 117 | 119 |
| 250 N | 131 | 135 | 140 | 138 |
| 300 N | 162 | 161 | 166 | 164 |
| 350 N | — | 188 | 182 | 193 |
| 400 N | — | — | — | — |

TABLE 5

Vulcanization of a blend of NR and cis-BR (ratio 80:20 by weight) with sulfur and CBS (2.0 and 1.0 phr, respectively) - Comparison Example F

| | Vulcanization | After aging at 100° C. | | |
|---|---|---|---|---|
| Property | 40 min at 150° C. | 7 d | 14 d | 21 d |
| Tensile strength, MPa | 20.4 | 13.6 | 3.5 | 2.7 |
| Elongation at failure, % | 510 | 275 | 60 | 46 |
| Modulus of elongation, | | | | |
| MPa - 100% | 2.0 | 3.2 | — | — |
| 300% | 9.8 | — | — | — |
| Structural strength, | 66 | 44 | 12 | 7 |

TABLE 5-continued

Vulcanization of a blend of NR and cis-BR (ratio 80:20 by weight) with sulfur and CBS (2.0 and 1.0 phr, respectively) - Comparison Example F

| Property | Vulcanization 40 min at 150° C. | After aging at 100° C. 7 d | 14 d | 21 d |
|---|---|---|---|---|
| N/mm | | | | |
| Tension set, % | 14 | 5 | 0 | 0 |
| Shore A hardness, | | | | |
| 22° C., | 62 | 69 | 76 | 80 |
| 75° C., | 58 | 63 | 70 | 71 |
| Resilient elasticity | | | | |
| at 22° C., % | 48 | 50 | 44 | 40 |
| 75° C., % | 59 | 61 | 58 | 56 |
| DIN abrasive wear, mm³ | 105 | 214 | 255 | 281 |
| Density, g/cm³ | 1.09 | 1.09 | 1.09 | 1.09 |
| Compression set, 24 hr. at 70° C., % | 20 | 22 | 24 | 26 |
| Sphere crushing test | | | | |
| 150 N | 98 | 84 | 96 | Could |
| 200 N | 135 | 110 | 130 | not be |
| 250 N | 158 | 138 | — | tested |
| 300 N | — | 185 | — | |
| 350 N | — | — | — | |
| 400 N | — | — | — | |

TABLE 6

Vulcanization of an SBR 1500 with BDTE (4.5 phr) - Example 4

1,2-Bis(N,N-diethylthiocarbamoyldisulfido)-ethane at 4.5 phr

| Property | Vulcameter, 40 min. at 150° C. | After aging 7 days at the temperatures indicated | | | |
|---|---|---|---|---|---|
| | | 100° C. | 110° C. | 120° C. | 130° C. |
| Tensile strength, MPa | 22.9 | 16.5 | 16.0 | 13.5 | 5.0 |
| Elongation at failure, % | 473 | 276 | 248 | 187 | 50 |
| Modulus of elongation, MPa - | | | | | |
| 100% | 2.2 | 3.6 | 4.3 | 5.7 | — |
| 300% | 11.6 | — | — | — | — |
| Structural strength, N/mm | 29 | 27 | 17 | 8.5 | — |
| Tension set, mm³ | 8 | 4 | 3 | 2 | 1 |
| Shore A hardness at | | | | | |
| 22° C., % | 65 | 70 | 73 | 74 | 76 |
| 75° C., % | 60 | 65 | 69 | 69 | 73 |
| Resilient elasticity at | | | | | |
| 22° C., % | 46 | 53 | 50 | 56 | 47 |
| 75° C., % | 59 | 63 | 63 | 62 | 58 |
| DIN abrasive wear, mm³ | 109 | 119 | 131 | 139 | 171 |
| Density, g/cm³ | 1.12 | 1.12 | 1.12 | 1.12 | 1.12 |
| Compression set, 24 hr. at 70° C., % | 18 | 13 | 13 | 13 | 12 |

TABLE 6a

Vulcanization of an SBR 1500 with BDBzTE - Example 4a 1,2-Bis(N,N-diethylthiocarbamoyldisulfido)-ethane at 7.0 phr

| Property | Vulcameter, 40 min. at 150° C. | After aging 7 days at the temperatures indicated | | | |
|---|---|---|---|---|---|
| | | 100° C. | 110° C. | 120° C. | 130° C. |
| Tensile strength, MPa | 20.3 | 14.5 | 14.0 | 11.7 | 5.1 |
| Elongation at failure, % | 502 | 293 | 266 | 197 | 55 |
| Modulus of elongation, MPa - | | | | | |
| 100% | 1.9 | 3.3 | 4.0 | 5.3 | — |
| 300% | 10.1 | — | — | — | — |
| Structural strength, N/mm | 33 | 31 | 20 | 8.5 | — |
| Tension set, mm³ | 10 | 6 | 5 | 3 | 1 |
| Shore A hardness at | | | | | |
| 22° C., % | 64 | 69 | 73 | 75 | 78 |
| 75° C., % | 57 | 65 | 69 | 70 | 74 |
| Resilient elasticity at | | | | | |
| 22° C., % | 44 | 50 | 51 | 50 | 44 |
| 75° C., % | 56 | 61 | 60 | 62 | 55 |
| DIN abrasive wear, mm³ | 101 | 112 | 126 | 138 | 173 |
| Density, g/cm³ | 1.12 | 1.12 | 1.12 | 1.12 | 1.12 |
| Compression set, 24 hr. at 70° C., % | 21 | 17 | 16 | 17 | 14 |

TABLE 7

Vulcanization of an SBR 1500 with sulfur/CBS - Comparison Example G

Sulfur/CBS = 2.2/1.2 phr

| Property | Vulcameter, 40 min. at 150° C. | After aging 7 days at the temperatures indicated | | | |
|---|---|---|---|---|---|
| | | 100° C. | 110° C. | 120° C. | 130° C. |
| Tensile strength, MPa | 22.0 | 18.3 | 9.5 | 6.2 | 3.6 |
| Elongation at failure, % | 427 | 309 | 124 | 35 | — |
| Modulus of elongation, MPa - | | | | | |
| 100% | 2.4 | 3.5 | 7.1 | — | — |
| 300% | 13.1 | 17.7 | — | — | — |
| Structural strength, N/mm | 31 | 26 | 6.8 | — | — |
| Tension set, mm³ | 8 | 5 | 2 | 1 | 1 |
| Shore A hardness at | | | | | |
| 22° C., % | 66 | 73 | 78 | 82 | 87 |
| 75° C., % | 60 | 69 | 75 | 78 | 85 |
| Resilient elasticity at | | | | | |
| 22° C., % | 44 | 60 | 57 | 41 | 38 |
| 75° C., % | 58 | 65 | 63 | 56 | 53 |
| DIN abrasive wear, mm³ | 98 | 118 | 159 | 167 | 220 |
| Density, g/cm³ | 1.12 | 1.12 | 1.12 | 1.12 | 1.12 |
| Compression set, 24 hr. at 70° C., % | 14 | 11 | 12 | 13 | 13 |

Results of Example 4 and Comparison Example G:

Comparison reveals the superiority of the inventively crosslinked tire tread vulcanizates, in abrasive wear behavior, under conditions of stepwise intensified aging. Results of Example 5 and Comparison Example H:

With these polydiene rubbers the superiority of the abrasion resistance of the inventive tire treads under high stressing with oxygen and heat is apparent.

TABLE 8

Vulcanization of a blend of NR/BR/SBR in a weight ratio of 50:30:20 with BDTE (4.5 phr) - Example 5

| Property | Vulcanization 40 min at 150° C. | After aging at 100° C. | | |
|---|---|---|---|---|
| | | 7 d | 14 d | 21 d |
| Tensile strength, MPa | 17.8 | 13.4 | 12.5 | 9.1 |
| Elongation at failure, % | 470 | 320 | 275 | 230 |
| Modulus of elongation, | | | | |
| MPa - 100% | 2.8 | 3.1 | 4.1 | 4.4 |
| 300% | 10.1 | — | — | — |
| Structural strength, N/mm | 58 | 60 | 55 | 46 |
| Tension set, % | 11 | 8 | 5 | 3 |
| Shore A hardness, | | | | |
| 22° C., | 68 | 75 | 77 | 80 |
| 75° C., | 58 | 67 | 69 | 71 |
| Resilient elasticity | | | | |
| at 22° C., % | 39 | 41 | 41 | 42 |
| 75° C., % | 56 | 56 | 57 | 56 |
| DIN abrasive wear, mm$^3$ | 78 | 112 | 128 | 168 |
| Density, g/cm$^3$ | 1.10 | 1.10 | 1.10 | 1.10 |
| Compression set, 24 hr. at 70° C., % | 20 | 22 | 22 | 23 |
| Sphere crushing test | | | | |
| 150 N | 98 | 88 | 89 | 95 |
| 200 N | 131 | 116 | 118 | 113 |
| 250 N | 145 | 143 | 138 | 145 |
| 300 N | 169 | 165 | 164 | 158 |
| 350 N | — | 189 | 176 | 195 |
| 400 N | — | — | — | — |

TABLE 8a

Vulcanization of a blend of NR/BR/SBR in a weight ratio of 50:30:20 with BDBzTE (7.0 phr) - Example 5a

| Property | Vulcanization 40 min at 150° C. | After aging at 100° C. | | |
|---|---|---|---|---|
| | | 7 d | 14 d | 21 d |
| Tensile strength, MPa | 16.1 | 12.1 | 11.3 | 8.0 |
| Elongation at failure, % | 483 | 331 | 282 | 244 |
| Modulus of elongation, | | | | |
| MPa - 100% | 2.6 | 2.9 | 3.8 | 4.0 |
| 300% | 9.5 | 10.3 | — | — |
| Structural strength, N/mm | 59 | 58 | 52 | 42 |
| Tension set, % | 12 | 10 | 7 | 4 |
| Shore A hardness, | | | | |
| 22° C., | 65 | 72 | 75 | 79 |
| 75° C., | 56 | 65 | 70 | 71 |
| Resilient elasticity | | | | |
| at 22° C., % | 38 | 40 | 41 | 39 |
| 75° C., % | 53 | 54 | 55 | 53 |
| DIN abrasive wear, mm$^3$ | 76 | 109 | 126 | 170 |

TABLE 8a-continued

Vulcanization of a blend of NR/BR/SBR in a weight ratio of 50:30:20 with BDBzTE (7.0 phr) - Example 5a

| Property | Vulcanization 40 min at 150° C. | After aging at 100° C. | | |
|---|---|---|---|---|
| | | 7 d | 14 d | 21 d |
| Density, g/cm$^3$ | 1.10 | 1.10 | 1.10 | 1.10 |
| Compression set, 24 hr. at 70° C., % | 22 | 23 | 23 | 24 |
| Sphere crushing test | | | | |
| 150 N | 96 | 93 | 91 | 97 |
| 200 N | 126 | 117 | 119 | 118 |
| 250 N | 141 | 142 | 140 | 148 |
| 300 N | 167 | 161 | 166 | 167 |
| 350 N | — | 184 | 179 | 192 |
| 400 N | — | — | — | — |

TABLE 9

Vulcanization of a blend of NR/BR/SBR in a weight ratio of 50:30:20 with sulfur and CBS (2.5 and 1.5 phr, respectively) - Comparison Example H

| Property | Vulcanization 40 min at 150° C. | After aging at 100° C. | | |
|---|---|---|---|---|
| | | 7 d | 14 d | 21 d |
| Tensile strength, MPa | 18.1 | 11.6 | 5.1 | 3.7 |
| Elongation at failure, % | 459 | 210 | 75 | 40 |
| Modulus of elongation, | | | | |
| MPa - 100% | 2.2 | 3.5 | — | — |
| 300% | 9.5 | — | — | — |
| Structural strength, N/mm | 61 | 39 | 11 | 6 |
| Tension set, % | 13 | 5 | — | — |
| Shore A hardness, | | | | |
| 22° C., % | 67 | 76 | 79 | 84 |
| 75° C., % | 58 | 65 | 70 | 76 |
| Resilient elasticity | | | | |
| at 22° C., % | 38 | 41 | 45 | 41 |
| 75° C., % | 54 | 56 | 54 | 53 |
| DIN abrasive wear, mm$^3$ | 74 | 171 | 205 | 251 |
| Density, g/cm$^3$ | 1.10 | 1.10 | 1.10 | 1.10 |
| Compression set, 24 hr. at 70° C., % | 20 | 24 | 25 | 26 |
| Sphere crushing test | | | | |
| 150 N | 105 | 98 | 96 | Could not be tested |
| 200 N | 141 | 118 | 148 | |
| 250 N | 168 | 151 | — | |
| 300 N | — | — | — | |
| 350 N | — | — | — | |
| 400 N | — | — | — | |

Examples 6 and 6a, and Comparison Example I:

Road tests were carried out to determine tread life, on an accurately defined test .track, comprised one half of Autobahn and one half of ordinary highway. The test objects were tires of size 175 SR 14. The vehicles used were Ford Scorpio 2.Os. The rubber used for all tire treads was a vinyl-SBR with styrene and 40% of 1,2-configuration of the butadiene units.

The following characteristics were compared:

|  | Comparison Example I | Example 5 |
|---|---|---|
| Vinyl-SBR with 20% styrene and 40% vinyl component | 137.5 parts | 137.5 parts |
| High aromatic content oil 37.5 phr | 37.5 phr |  |
| ZnO | 3.0 parts | 3.0 parts |
| Stearic acid | 2.0 parts | 2.0 parts |
| HAR oil | 2.5 parts | 2.5 parts |
| KORESIN ® | 2.0 parts | 2.0 parts |
| VULKANOX ® 4020 | 1.0 part | 1.0 part |
| VULKANOX 4010 Na | 1.0 part | 1.0 part |
| Carbon black N-339 | 80 parts | 80 parts |
| Sulfur | 2.2 parts | — |
| VULKACIT ® CZ | 1.2 parts | — |
| BDTE | — | 4.5 parts |

Tire results (Index: Comparison Example I=100):

|  | Example 6 (BDTE) | Example 6a (BDBzTE) |
|---|---|---|
| Wet skidding test, 50 km/hr | 100 | 100 |
| Wear in 20,000 km (score) | 114 | 115 |

The wet skidding test results were determined by the "stopping distance" method, on a wet asphalt surface. The appreciably higher wear score for Example 5 indicates less wear. The tire test results show a more favorable picture of the compromise between wear resistance and wet non-skid behavior.

Examples 7 and 7a, and Comparison Example J:

Another set of road tests was carried out, analogously to Examples 6 and 6a, with the use of an integral rubber, which is a copolymer according to Ger. OS 37 10 002 (Example 1 thereof), comprised of butadiene, isoprene, and styrene. The character-istic feature of this rubber is a greatly broadened maximum of the tan delta temperature function, extending over the range −80 of 15° C. Mooney viscosity was 55.

The tire tread characteristics were compared as follows:

|  | Comparison Example J | Example 7 |
|---|---|---|
| Integral rubber | 100 phr | 100 phr |
| ZnO | 3 phr | 3 phr |
| Stearic acid | 2 phr | 2 phr |
| High aromatic content oil | 10 phr | 10 phr |
| KORESIN ® | 2 phr | 2 phr |
| VULKANOX ® 4020 | 1 phr | 1 phr |
| VULKANOX ® 4010 Na | 1 phr | 1 phr |
| Carbon black N-339 | 50 phr | 50 phr |
| Sulfur | 1.7 phr | — |
| CBS | 1.2 phr | — |
| BDTE | — | 4.5 phr |

Tire results (Index: Comparison Example J=100):

|  | Example 7 (BDTE) | Example 7a (BDBzTE) |
|---|---|---|
| Wet skidding test, 50 km/hr | 100 | 100 |
| Tread life after 20,000 km | 112 | 115 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A method of producing a tire tread, without the use of sulfur, comprising:
    vulcanizing and crosslinking a polydiene rubber selected from the group consisting of natural rubber, isoprene rubber, styrene-butadiene rubber produced by emulsion polymerization, styrene-butadiene rubber produced by solution polymerization, styrene-butadiene rubber having a vinyl content of more than 15% based on the number of butadiene units, butadiene rubber containing more than 20% double bonds in the cis-configuration, and butadiene rubber having a vinyl content of more than 15% based on the number of butadiene units, for a vulcanizing and crosslinking effective time and at a temperature of 150°–200° C. with a crosslinking agent consisting of 1,2-bis(N,N-dibenzylthiocarbamoyldisulfido) ethane, wherein said crosslinking agent is used in an amount of 4–9 parts per 100 parts rubber.

2. The method of claim 1, wherein said temperature is 170°–190° C.

3. The method of claim 1, wherein said rubber is styrene-butadiene rubber produced by emulsion polymerization.

4. The method of claim 1, wherein said rubber is styrene-butadiene rubber produced by solution polymerization.

5. The method of claim 1, wherein said rubber is natural rubber.

6. A tire tread produced by the method of claim 1.
7. A tire tread produced by the method of claim 2.
8. A tire tread produced by the method of claim 3.
9. A tire tread produced by the method of claim 4.
10. A tire tread produced by the method of claim 5.

\* \* \* \* \*